United States Patent
Wang et al.

(10) Patent No.: US 7,168,468 B2
(45) Date of Patent: Jan. 30, 2007

(54) VEHICLE WHEEL ASSEMBLY WITH A HOLLOW STUD AND INTERNAL PASSAGEWAYS CONNECTED TO A CTIS

(75) Inventors: Jinjun Wang, Piscataway, NJ (US); Olivier Marsaly, Washington Crossing, PA (US); Larry Rogers, Princeton, NJ (US)

(73) Assignee: Hutchinson, S.A., Paris (FR)

( * ) Notice: Subject to any disclaimer, the term of this patent is extended or adjusted under 35 U.S.C. 154(b) by 52 days.

(21) Appl. No.: 10/832,419

(22) Filed: Apr. 27, 2004

(65) Prior Publication Data
US 2005/0236083 A1 Oct. 27, 2005

(51) Int. Cl.
*B60C 23/10* (2006.01)
(52) U.S. Cl. .................. 152/427; 152/428
(58) Field of Classification Search ........... 152/415, 152/427, 428
See application file for complete search history.

(56) References Cited

U.S. PATENT DOCUMENTS

| | | | |
|---|---|---|---|
| 1,452,284 A * | 4/1923 | Steinmetz | ............ 152/428 |
| 4,106,543 A * | 8/1978 | Sano | ............ 152/405 |
| 4,418,737 A | 12/1983 | Goodell et al. | |
| 4,434,833 A * | 3/1984 | Swanson et al. | ............ 152/417 |
| 4,733,707 A * | 3/1988 | Goodell et al. | ............ 152/417 |
| 4,836,261 A * | 6/1989 | Weeks et al. | ............ 152/405 |
| 4,893,664 A | 1/1990 | Oltean | |
| 5,249,609 A | 10/1993 | Walker et al. | |
| 6,145,559 A | 11/2000 | Ingram, II | |
| 6,182,727 B1 * | 2/2001 | Beesley | ............ 152/417 |
| 6,286,469 B1 | 9/2001 | Cobb, Jr. | |
| 6,474,383 B1 | 11/2002 | Howald et al. | |

* cited by examiner

*Primary Examiner*—Jason R. Bellinger
(74) *Attorney, Agent, or Firm*—Shlesinger & Fitzsimmons

(57) ABSTRACT

A vehicle wheel assembly includes a rim secured to a hub of a wheel, a tire secured to the rim, and a hollow stud. The hollow stud includes an air passageway and extends through a rim opening that one end secured to the hub. A lug nut is secured to the hollow stud at its other end. The one end is operably connected to a source of compressed air through the air passageway. A central tire inflation valve is secured to the rim. The rim includes a first internal passageway communicating with the air passageway and the valve, and a second internal passageway communicating with the valve and the interior of the tire.

13 Claims, 5 Drawing Sheets

VEHICLE WHEEL ASSEMBLY WITH A HOLLOW STUD AND INTERNAL PASSAGEWAYS CONNECTED TO A CTIS

FIELD OF THE INVENTION

The present invention relates generally to a vehicle wheel assembly equipped with a central tire inflation system (CTIS), and particularly to a wheel assembly using a hollow stud to connect a source of compressed air in the vehicle to a CTIS valve for adjusting the air pressure inside the tire.

BACKGROUND OF THE INVENTION

Central tire inflation systems (CTIS) are well-known in the art. A CTIS allows for remote inflation and deflation of the vehicle tires from the vehicle cabin to adjust the tire pressure to suit the type of terrain, such as highway, country road, sandy/muddy, emergency, etc. Examples of a CTIS are disclosed in U.S. Pat. Nos. 4,836,261, 6,286,469, 6,145,559 and 4,418,737. It has been customary for some vehicles equipped with CTIS to connect the air power source inside the vehicle to the vehicle tires through various wheel-mounted valves, hoses and fittings, which are typically exposed on the outside face of the wheel. See, for example, U.S. Pat. No. 4,418,737. This arrangement has the potential to damage the exposed inflation components when the vehicle, such as a military truck, travel over off-road terrain. Further, the various wheel-mounted hoses and fittings contribute to some installation difficulty and cost.

OBJECTS AND SUMMARY OF THE INVENTION

It is therefore an object of the present invention to provide a vehicle wheel assembly with an internal passageway to connect the vehicle pneumatic power motor to the tire through the CTIS valve without the need for hoses and fittings that are exposed on the face of the wheel, thereby minimizing the potential to damage from outside sources, such as when the vehicle goes off-road.

It is another object of the present invention to provide a wheel assembly that connects the tire to a source of compressed air through a hollow stud and internal passageways without wheel-mounted hoses and fittings so that changing a tire would be similar to changing a normal wheel, which does not involve removing any hoses or fittings.

In summary, the present invention provides a vehicle wheel assembly, comprising a rim secured to a hub of a wheel; a tire secured to the rim; and a hollow stud having an air passageway. The hollow stud extends through a rim opening and has a first end secured to the hub. A lug nut is secured to the hollow stud at a second end. The first end is operably connected to a source of compressed air through the air passageway. A central tire inflation valve is secured to the rim. The rim includes a first internal passageway communicating with the air passageway and the valve, and a second internal passageway communicating with the valve and the interior of the tire.

In another embodiment of the present invention, a vehicle wheel assembly comprises a rim secured to a hub of a wheel; a tire secured to the rim; and a hollow stud having a through opening through its length and extending through a rim opening. The hollow stud has a first end secured to the hub. A central tire inflation valve is secured to the hollow stud at a second end and sealed against the rim. The first end is operably connected to a source of compressed air through the hub. The rim includes an internal passageway communicating with the through opening via the valve.

These and other objects of the present invention will become apparent from the following detailed description.

BRIEF DESCRIPTIONS OF THE DRAWINGS

DETAILED DESCRIPTION OF THE INVENTION

Figure 1:
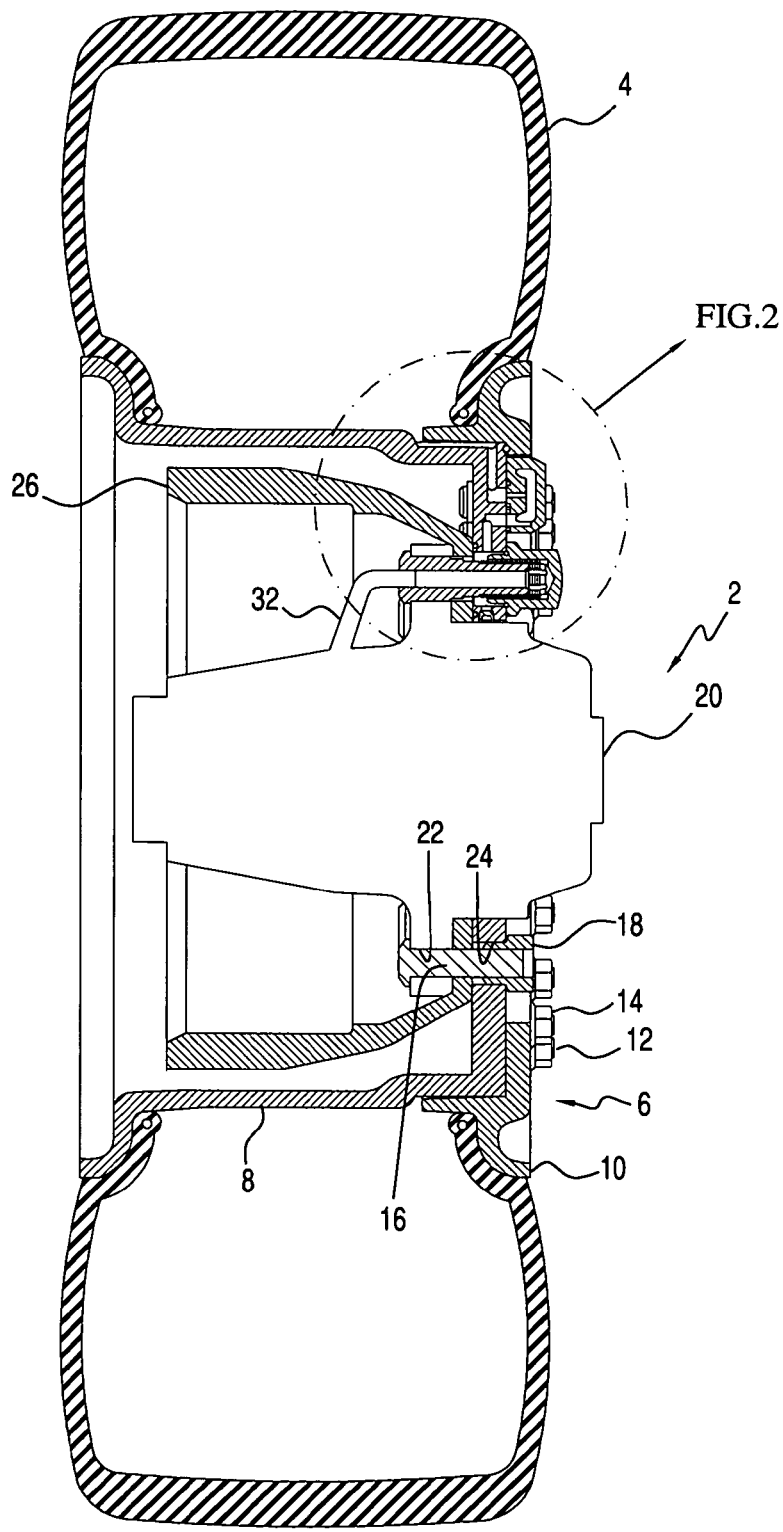
FIG. 1 is a cross-sectional view of a wheel assembly incorporating the present invention.

A wheel assembly 2 made in accordance with the present invention is disclosed in FIG. 1. The wheel assembly 2 includes a tire 4 operably secured to a rim 6 having an inner rim part 8 and outer rim part 10. A plurality of bolts 12 and nuts 14 clamp the outer rim part 10 to the inner rim part 8. Standard stud bolts 16 (only one shown) and associated standard lug nuts 18 secure the wheel assembly 2 to a wheel hub 20. Each stud bolt 16 is received within a corresponding opening 22 in the hub 20 and opening 24 in the rim 6. A brake housing 26 is also secured to the hub 20 by the studs 16 and the corresponding lug nuts 18.

Figure 2:
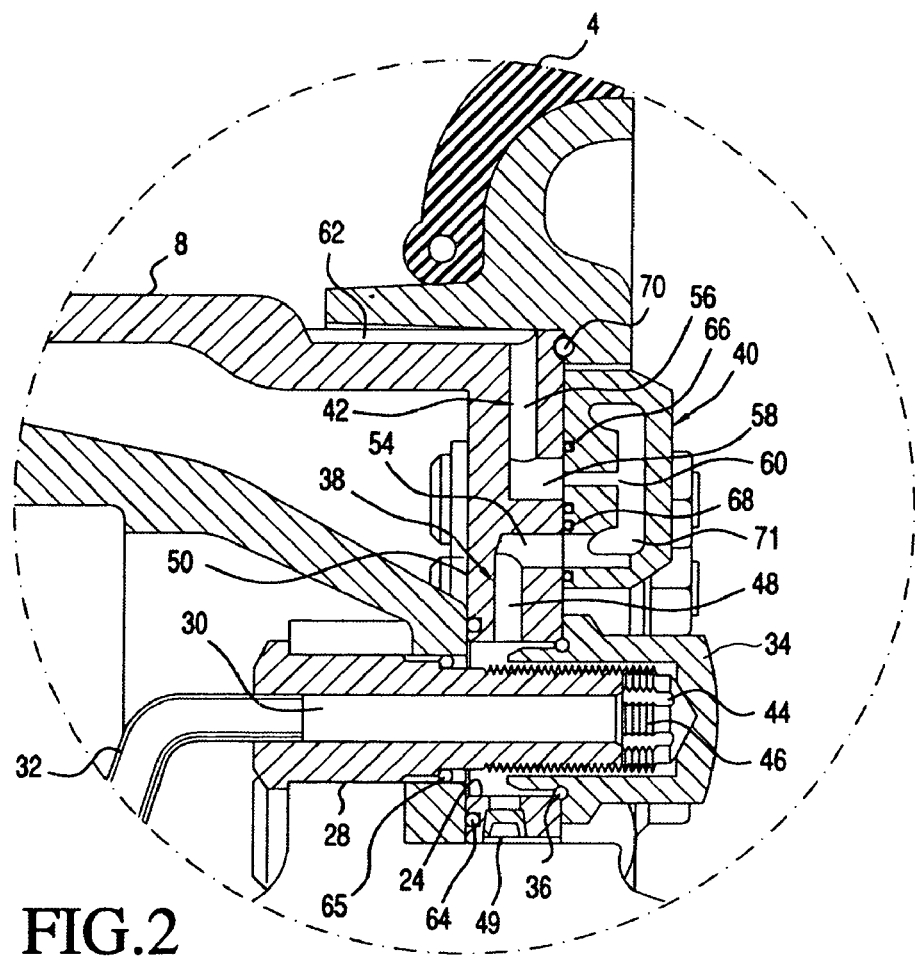
FIG. 2 is an enlarged cross-sectional view of a portion of FIG. 1, showing the present invention.
Figure 3:
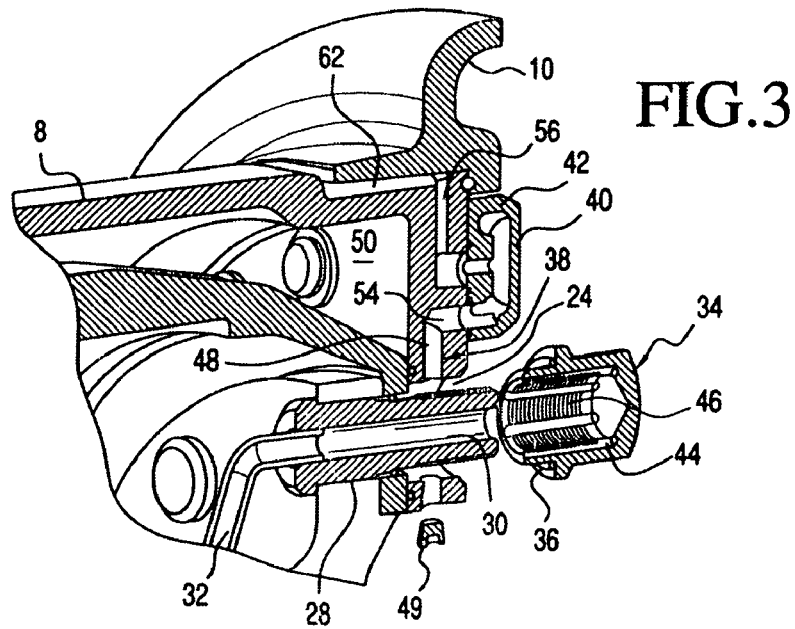
FIG. 3 is a perspective view of FIG. 2, with some components shown disassembled.

Referring to FIGS. 2 and 3, a hollow stud 28 with a through opening 30 is connected at one end to an air connection hose 32. The opening 30 constitutes an air passageway as will become apparent below. The hose 32 is operably connected in a conventional manner to the vehicle's source of compressed air, such as a conventional pneumatic power motor (not shown), through the hub 20, to supply compressed air to the tire 4. A cup-shaped lug nut 34 seals the other end of the stud 28 from the outside with a resilient O-ring 36.

A series of passageways 38 connect the hollow stud opening 30 to a conventional CTIS valve 40, which in turn communicates with the interior of the tire 4 through another series of interconnected passageways 42. Examples of the valve 40 are disclosed in U.S. Pat. No. 6,474,383, 5,249,609 and 4,893,664.

A number of axial grooves or channels 44 within the lug nut 34 cut through the inside threads 46 to provide passageways through the lug nut 34 from the opening 30 to the stud hole 24. A passageway 48 within a vertical wall section 50 of the inner rim part 8 connects with the opening 24 and a horizontal passageway or counter bore 54, which in turn communicates with the valve 40. A plug 49 seals an unused portion of the passageway 48. It should be understood that the series of passageways 38 are comprised of the grooves 44, the hole 24, the vertical passageway 48 and the horizontal passageway 54.

The vertical wall section 50 includes another vertical passageway 56 that connects with a horizontal passageway or counter bore 58, which in turn communicates with the CTIS valve 40 through a passageway 60. A channel 62 connects with the vertical passageway 56 and communicates with the interior of the tire 4. The channel 62 is disposed on an interface between the inner and outer rim parts 8 and 10. It should be understood that the series of passageways 42 are comprised of the vertical passageway 56, the horizontal passageway 58 and the channel 62.

Resilient O-rings or other standard seals are provided to seal the various passageways and opening from the outside. O-rings 64, 65 and 36 seal the opening 24. O-rings 66 and 68 seal the valve 40 with respect to the passageways 58 and 54. O-ring 70 seals-the inner rim part 8 against the outer rim part 10.

The valve 40 has an internal passageway 71 that communicates with the passageways 54 and 60. A valve mechanism (not shown) is understood to control the flow of compressed air from the vehicle compressed air source through the passageways 71 and 60. Deflation of the tire 4 is controlled through the passageway 60.

Figure 4:
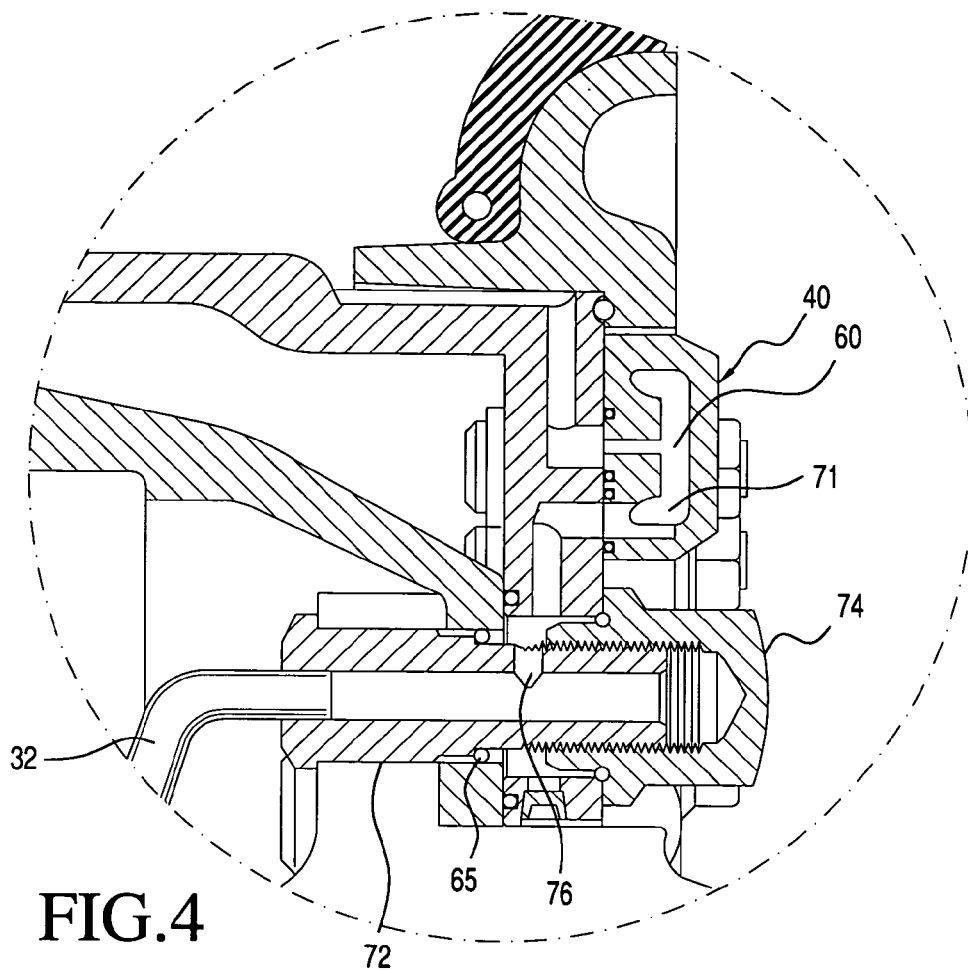
FIG. 4 is an enlarged cross-sectional view similar to FIG. 2, showing another embodiment of the present invention.
Figure 5:
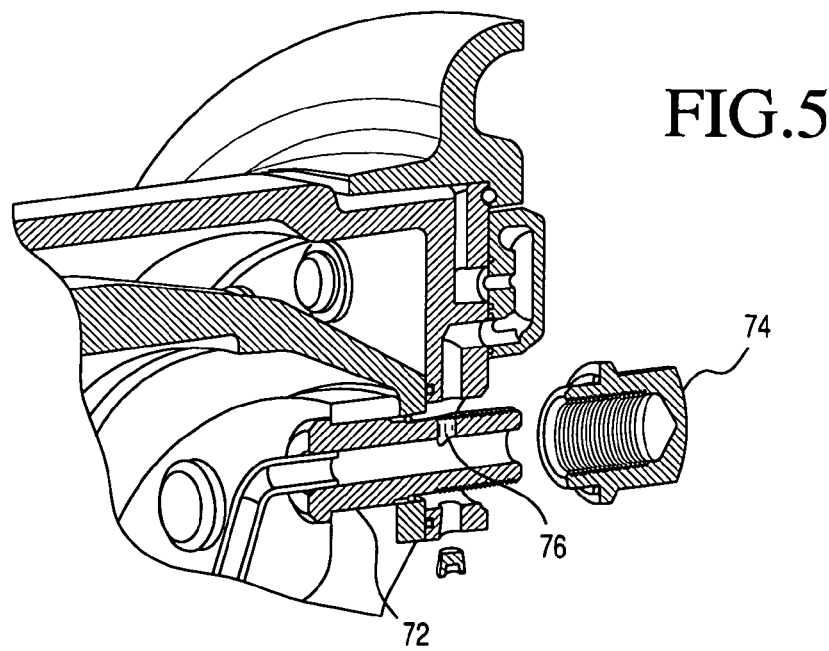
FIG. 5 is a perspective view of FIG. 4, with some components shown disassembled.

Another embodiment of the present invention is disclosed in FIGS. 4 and 5. The various parts disclosed in the embodiment of FIGS. 1–3 are the same, except that the hollow stud 28 and lug nut 34 have been replaced with a hollow stud 72 and a cup-shaped lug nut 74. The stud 72 includes a radial hole 76 through its wall section. The lug nut 74 does not have the grooves as in the lug nut 34 so that compressed air flows directly from the air hose 32 through the hole 76 and thence to the valve 40.

Figure 6:
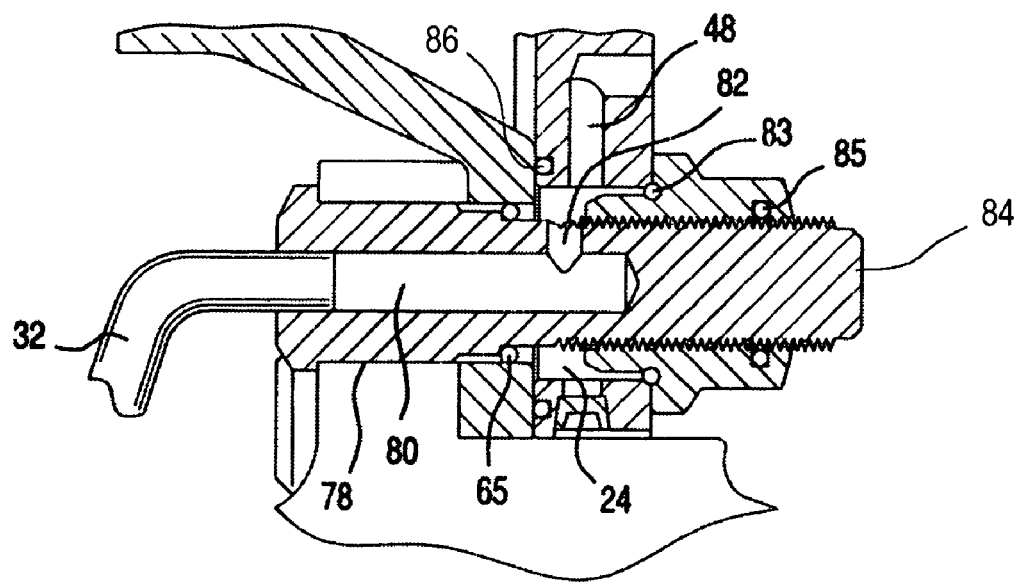
FIG. 6 is another embodiment of the present invention.

Another embodiment of the present invention is disclosed in FIG. 6. A stud 78 has an axial blind hole 80 and a communicating radial hole 82. The blind hole 80 communicates with the passageway 48 in the wheel via the radial hole 82 and rim opening 24. A self-sealing lug nut 84, which includes seals 83 and 85, and seal 86 seal the rim opening 24 from the outside.

Figure 7:
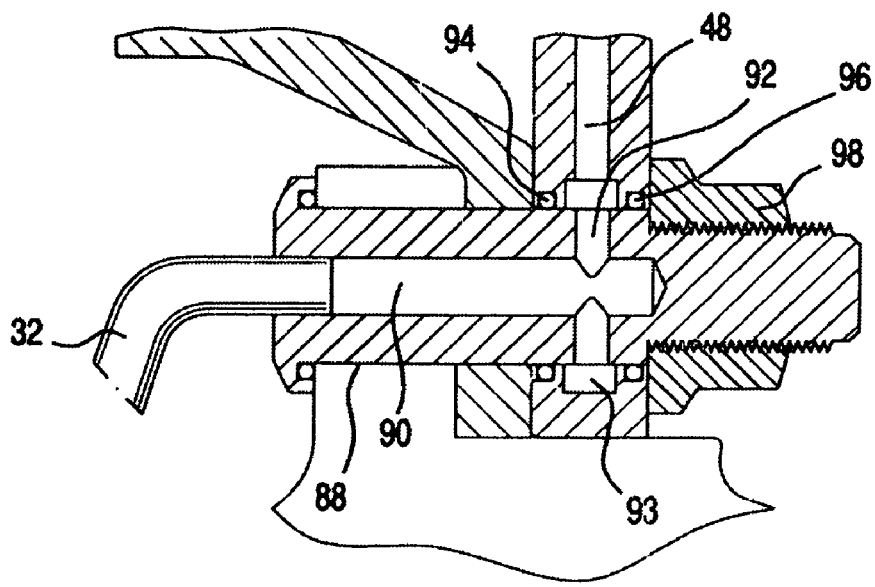
FIG. 7 is similar to the FIG. 6 embodiment.

In the embodiment of FIG. 7, a stud 88 has an axial blind hole 90 and a communicating radial opening 92. An annular groove 93 around the wall of the rim opening 24 provides communication between the passageway 48 and blind hole 90 via the radial opening 92. Seals 94 and 96 seal the opening 92 and passageway 48 from the outside. A standard lug nut 98 is used with the stud 88.

Figure 8:
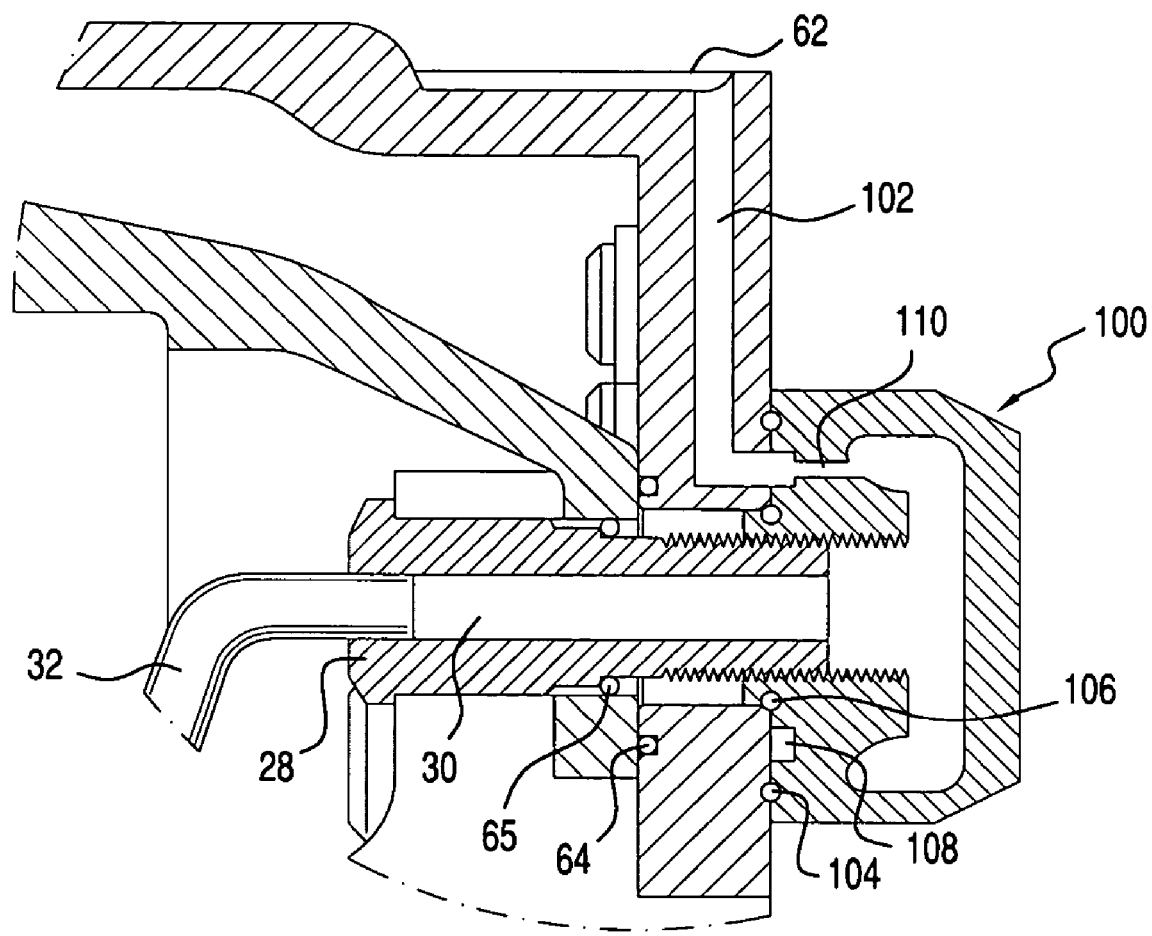
FIG. 8 is still another embodiment of the present invention.

In the embodiment of FIG. 8, a CTIS valve 100 is screwed directly to the hollow stud 28. The axial opening 30 communicates with the valve 100 and a passageway 102 that communicates with the channel 62. Seals 64, 65, 104 and 106 seal the passageway connecting the hole 30 to the channel 62 from the outside. An annular groove 108 communicates with the passageway 102 and a passageway 110 within the valve 100.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. A vehicle wheel assembly, comprising:
   a) rim secured to a hub of a wheel;
   b) a tire secured to said rim;
   c) a hollow stud having an air passageway, said hollow stud extending through a rim opening, said hollow stud having a first end secured to said hub;
   d) a lug nut secured to said hollow stud at a second end;
   e) said first end is operably connected to a source of compressed air through said air passageway;
   f) a central tire inflation valve secured to said rim; and
   g) said rim including a first internal passageway communicating with said air passageway and said valve, and a second internal passageway communicating with said valve and the interior of said tire.

2. A vehicle wheel assembly as in claim 1, wherein:
   a) said air passageway includes an axial through opening;
   b) said lug nut is cup-shaped and includes internal threads; and
   c) said first passageway includes a channel within said cup-shaped lug nut disposed across said threads that communicates with said through opening and said rim opening.

3. A vehicle wheel assembly as in claim 1, wherein:
   a) said air passageway includes an axial through opening and a radial opening communicating with said axial opening; and
   b) said radial opening communicates with said first passageway.

4. A vehicle wheel assembly as in claim 3, wherein said radial opening communicates with said rim opening.

5. A vehicle wheel assembly as in claim 1, wherein:
   a) said air passageway includes an axial blind hole and a radial opening communicating with said axial blind hole; and
   b) said radial opening communicates with said first internal passageway.

6. A vehicle wheel assembly as in claim 5, wherein said radial opening is sealed from said rim opening.

7. A vehicle wheel assembly as in claim 1, wherein said first internal passageway includes a first vertical passageway within a vertical wall section of said rim, said first vertical passageway communicating with said rim opening.

8. A vehicle wheel assembly as in claim 1, wherein said first internal passageway includes a first counter bore communicating with said valve and said first vertical passageway.

9. A vehicle wheel assembly as in claim 1, wherein said second internal passageway includes a second internal vertical passageway connected to a second counter bore, said second counter bore communicating with said valve.

10. A vehicle wheel assembly as in claim 1, wherein:
    a) said rim includes first and second rim parts joined together;
    b) said first rim part including an interface with said second rim part that extends into the interior of said tire;
    c) said second internal passageway includes a channel in said first rim part adjacent said interface, said channel communicating with second vertical internal passageway and the interior of said tire.

11. A vehicle wheel assembly as in claim 1, and further comprising a resilient O-ring disposed between said rim and said lug nut to seal said rim opening from the outside.

12. A vehicle wheel assembly as in claim 1, and further comprising a resilient O-ring disposed between said rim and said valve to seal said first counter bore from the outside.

13. A vehicle wheel assembly as in claim 1, and further comprising a resilient O-ring disposed between said rim and said valve to seal said second counter bore from the outside.

* * * * *